(12) United States Patent
Goto

(10) Patent No.: US 7,865,656 B2
(45) Date of Patent: Jan. 4, 2011

(54) STORAGE CONTROLLER AND STORAGE CONTROL METHOD

(75) Inventor: Yoshitsugu Goto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 456 days.

(21) Appl. No.: 11/907,124

(22) Filed: Oct. 9, 2007

(65) Prior Publication Data

US 2008/0162832 A1 Jul. 3, 2008

(30) Foreign Application Priority Data

Dec. 28, 2006 (JP) .............................. 2006-355253

(51) Int. Cl.
*G06F 12/00* (2006.01)

(52) U.S. Cl. ............................... 711/2; 711/5; 711/101; 711/154; 711/202; 711/209

(58) Field of Classification Search .................. 711/209
See application file for complete search history.

(56) References Cited

U.S. PATENT DOCUMENTS

| | | | | |
|---|---|---|---|---|
| 5,280,599 | A * | 1/1994 | Arai | 711/172 |
| 6,757,751 | B1 * | 6/2004 | Gene | 710/36 |
| 6,862,675 | B1 * | 3/2005 | Wakimoto | 711/202 |
| 2001/0003199 | A1 * | 6/2001 | Maruyama et al. | 711/165 |
| 2005/0108463 | A1 * | 5/2005 | Hargis et al. | 711/5 |
| 2005/0144418 | A1 * | 6/2005 | Kita | 711/203 |

FOREIGN PATENT DOCUMENTS

| | | | |
|---|---|---|---|
| JP | 10-91517 | | 4/1998 |
| JP | 10091517 A | * | 4/1998 |
| JP | 11-73368 | | 3/1999 |
| JP | 11073368 A | * | 3/1999 |
| JP | 2003-76603 | | 3/2003 |
| JP | 2003076603 A | * | 3/2003 |

* cited by examiner

*Primary Examiner*—Jack A Lane
(74) *Attorney, Agent, or Firm*—Staas & Halsey LLP

(57) ABSTRACT

A storage controller that can control memory addresses even when a memory module having a different device configuration than an already mounted memory module is added as an expansion module. More specifically, a storage controller for controlling a storage unit that can be constructed using a plurality of memory modules is configured so as to include: a register which stores memory module configuration information for a basic memory module and an expansion memory module independently of each other; and an address conversion unit which, based on the memory module configuration information stored in the register, generates an address that can access the storage unit even when the memory address space of the expansion memory module is different from the memory address space of the basic memory module.

5 Claims, 10 Drawing Sheets

Fig.2
PRIOR ART

| Physical MSU LIMIT ADD | MAC | BANK | RAM |
|---|---|---|---|
| 1 0 | 1 0 | 1 0 | 1 0 |

Physical MSU LIMIT ADD : PHYSICAL MSU LIMIT ADDRESS

MAC: ONLINE INFORMATION OF MAC CHIP
   '10' : SINGLE-MAC CONFIGURATION (MAC0)
   '01' : SINGLE-MAC CONFIGURATION (MAC1)
   '11' : TWO-MAC CONFIGURATION (MAC0+MAC1)

BANK: BANK CONFIGURATION OF MAC
   '10' : SINGLE-BANK CONFIGURATION (BANK0)
   '01' : SINGLE-BANK CONFIGURATION (BANK1)
   '11' : TWO-BANK CONFIGURATION (BANK0+BANK1)

RAM : DIMM TYPE
   BIT CAPACITY   MEMORY DEVICE × QUANTITY (TYPE OF MOUNTING)
   '00': 1GB       512Mbit-RAM × 18 (NON-STACKED TYPE)
   '01': 2GB       1Gbit-RAM × 18 (NON-STACKED TYPE) or 512Mbit-RAM × 36 (STACKED TYPE)
   '10': 4GB       2Gbit-RAM × 18 (NON-STACKED TYPE) or 1Gbit-RAM × 36 (STACKED TYPE)

Fig. 4

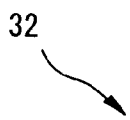

Physical MSU LIMIT ADD : PHYSICAL MSU LIMIT ADDRESS
MAC: ONLINE INFORMATION OF MAC CHIP
    '10' : SINGLE-MAC CONFIGURATION (MAC0)
    '01' : SINGLE-MAC CONFIGURATION (MAC1)
    '11' : TWO-MAC CONFIGURATION (MAC0+MAC1)
BANK : BANK CONFIGURATION OF MAC
    '10' : SINGLE-BANK CONFIGURATION (BANK0)
    '01' : SINGLE-BANK CONFIGURATION (BANK1)
    '11' : TWO-BANK CONFIGURATION (BANK0+BANK1)
CS0 RAM : DIMM TYPE (BASIC)
CS1 RAM : DIMM TYPE (EXPANSION)

| BIT | CAPACITY | MEMORY DEVICE × QUANTITY (TYPE OF MOUNTING) |
|---|---|---|
| '0000' | NOT MOUNTED | |
| '0001' | 1GB | 512Mbit-RAM × 18 (NON-STACKED TYPE) |
| '0010' | 2GB | 512Mbit-RAM × 36 (STACKED TYPE) |
| '0011' | 2GB | 1Gbit-RAM × 18 (NON-STACKED TYPE) |
| '0100' | 4GB | 1Gbit-RAM × 36 (STACKED TYPE) |
| '0101' | 4GB | 2Gbit-RAM × 18 (NON-STACKED TYPE) |

Fig. 5

```
CSn_DIMM_SIZE[1] <= CSn_RAM[3:1] == " 000"  //1GB
CSn_DIMM_SIZE[2] <= CSn_RAM[3:1] == " 001" //2GB
CSn_DIMM_SIZE[4] <= CSn_RAM[3:1] == " 010" //4GB

CSn_DRAM_SIZE[0] <= ( CSn_RAM[1] ^ CSn_RAM[0] ) & ˜CSn_RAM[3] & ˜CSn_RAM[2]   //512Mbit-RAM
CSn_DRAM_SIZE[1] <= (˜CSn_RAM[1] ^ CSn_RAM[0] )                                //  1Gbit-RAM
CSn_DRAM_SIZE[2] <= ( CSn_RAM[1] ^ CSn_RAM[0] ) & ˜CSn_RAM[3] &  CSn_RAM[2]   //  2Gbit-RAM CSn_DRAM_TYPE[1] <= ˜CSn_RAM[3] & ˜CSn_RAM[2] &  CSn_RAM[1] & ˜CSn_RAM[0]    //512Mbit-RAM×36
CSn_DRAM_TYPE[3] <= ˜CSn_RAM[3] &  CSn_RAM[2] & ˜CSn_RAM[1] & ˜CSn_RAM[0]    //  1Gbit-RAM×36
(n IS 0 OR 1)
```

Fig. 6

```
BNK_NO <= BANK[1] & BANK[0]  // 1BANK=0, 2BANK=1
MAC_NO <= MAC[1]  & MAC[0]   // 1MAC=0, 2MAC=1
MAC_BANK[11] <= ( ~MAC_NO &  ~BNK_NO )  // 1MAC-1BANK
MAC_BANK[12] <= ( ~MAC_NO &   BNK_NO )  // 1MAC-2BANK
MAC_BANK[21] <= (  MAC_NO &  ~BNK_NO )  // 2MAC-1BANK
MAC_BANK[22] <= (  MAC_NO &   BNK_NO )  // 2MAC-2BANK

CS_ADD_SEL[31] <= ( MAC_BANK[11] & CS0_DIMM_SIZE[1] )
CS_ADD_SEL[32] <= ( MAC_BANK[11] & CS0_DIMM_SIZE[2] ) | ( MAC_BANK[12] & CS0_DIMM_SIZE[1] )
                | ( MAC_BANK[21] & CS0_DIMM_SIZE[1] )
CS_ADD_SEL[33] <= ( MAC_BANK[11] & CS0_DIMM_SIZE[4] ) | ( MAC_BANK[12] & CS0_DIMM_SIZE[2] )
                | ( MAC_BANK[21] & CS0_DIMM_SIZE[2] ) | ( MAC_BANK[22] & CS0_DIMM_SIZE[1] )
CS_ADD_SEL[34] <= ( MAC_BANK[12] & CS0_DIMM_SIZE[4] ) | ( MAC_BANK[21] & CS0_DIMM_SIZE[4] )
                | ( MAC_BANK[22] & CS0_DIMM_SIZE[2] )
CS_ADD_SEL[35] <= ( MAC_BANK[22] & CS0_DIMM_SIZE[4] )
CS_SEL <= ( CS_ADD_SEL[31] & SYS_ADD[31] ) | ( CS_ADD_SEL[32] & SYS_ADD[32] )
        | ( CS_ADD_SEL[33] & SYS_ADD[33] ) | ( CS_ADD_SEL[34] & SYS_ADD[34] )
        | ( CS_ADD_SEL[35] & SYS_ADD[35] )
DIMM_SIZE[1,2,4] <= ( CS0_DIMM_SIZE[1,2,4] & ~CS_SEL ) | ( CS1_DIMM_SIZE[1,2,4] & CS_SEL )
DRAM_SIZE[0:2]   <= ( CS0_DRAM_SIZE[0:2]   & ~CS_SEL ) | ( CS1_DRAM_SIZE[0:2]   & CS_SEL )
DRAM_TYPE[1,3]   <= ( CS0_DRAM_TYPE[1,3]   & ~CS_SEL ) | ( CS1_DRAM_TYPE[1,3]   & CS_SEL )
```

Fig.7

```
                                                                              ~38
BK_ADD    <=  ( MAC_BANK[12] & SYS_ADD[06] ) | ( MAC_BANK[22] & SYS_ADD[06] )
ST_ADD    <=  ( MAC_BANK[11] & DRAM_TYPE[1] & SYS_ADD[08] ) | ( MAC_BANK[11] & DRAM_TYPE[3] & SYS_ADD[09] )
           |  ( MAC_BANK[12] & DRAM_TYPE[1] & SYS_ADD[09] ) | ( MAC_BANK[12] & DRAM_TYPE[3] & SYS_ADD[10] )
           |  ( MAC_BANK[21] & DRAM_TYPE[1] & SYS_ADD[08] ) | ( MAC_BANK[21] & DRAM_TYPE[3] & SYS_ADD[09] )
           |  ( MAC_BANK[22] & DRAM_TYPE[1] & SYS_ADD[09] ) | ( MAC_BANK[22] & DRAM_TYPE[3] & SYS_ADD[10] )
WAY_ADD[2]    <=  ( MAC_BANK[11] & ( DRAM_SIZE[1] + DRAM_SIZE[2] ) & SYS_ADD[08] )
              |   ( MAC_BANK[12] & ( DRAM_SIZE[1] + DRAM_SIZE[2] ) & SYS_ADD[09] )
              |   ( MAC_BANK[21] & ( DRAM_SIZE[1] + DRAM_SIZE[2] ) & SYS_ADD[08] )
              |   ( MAC_BANK[21] & ( DRAM_SIZE[1] + DRAM_SIZE[2] ) & SYS_ADD[09] )
WAY_ADD[1:0]  <=  ( MAC_BANK[11] & SYS_ADD[07:06] ) | ( MAC_BANK[12] & SYS_ADD[08:07] )
              |   ( MAC_BANK[21] & SYS_ADD[07:06] ) | ( MAC_BANK[22] & SYS_ADD[08:07] )
DIMM_ADD[25]     <=  ( DIMM_SIZE[4] & DRAM_SIZE[2] & SYS_ADD[13] )
DIMM_ADD[24:19]  <=  ( MAC_BANK[11] & DIMM_SIZE[1] & DRAM_SIZE[0] & SYS_ADD[13,12,11,10,09,08] )
                 |   ( MAC_BANK[11] & DIMM_SIZE[2] & DRAM_SIZE[0] & SYS_ADD[13,12,11,10,09,31] )
                 |   ( MAC_BANK[11] & DIMM_SIZE[2] & DRAM_SIZE[1] & SYS_ADD[13,12,11,10,09,31] )
                 |   ( MAC_BANK[11] & DIMM_SIZE[4] & DRAM_SIZE[1] & SYS_ADD[13,12,11,10,32,31] )
                 |   ( MAC_BANK[11] & DIMM_SIZE[4] & DRAM_SIZE[2] & SYS_ADD[12,11,10,09,32,31] )
                 |   ( MAC_BANK[12] & DIMM_SIZE[1] & DRAM_SIZE[0] & SYS_ADD[13,12,11,10,09,08] )
                 |   ( MAC_BANK[12] & DIMM_SIZE[2] & DRAM_SIZE[0] & SYS_ADD[13,12,11,10,09,31] )
                 |   ( MAC_BANK[12] & DIMM_SIZE[2] & DRAM_SIZE[1] & SYS_ADD[13,12,11,10,32,31] )
                 |   ( MAC_BANK[12] & DIMM_SIZE[4] & DRAM_SIZE[1] & SYS_ADD[13,12,11,33,32,31] )
                 |   ( MAC_BANK[12] & DIMM_SIZE[4] & DRAM_SIZE[2] & SYS_ADD[12,11,10,33,32,31] )
                 |   ( MAC_BANK[21] & DIMM_SIZE[1] & DRAM_SIZE[0] & SYS_ADD[13,11,10,09,08,31] )
                 |   ( MAC_BANK[21] & DIMM_SIZE[2] & DRAM_SIZE[0] & SYS_ADD[13,11,10,09,32,31] )
                 |   ( MAC_BANK[21] & DIMM_SIZE[2] & DRAM_SIZE[1] & SYS_ADD[13,11,10,09,32,31] )
                 |   ( MAC_BANK[21] & DIMM_SIZE[4] & DRAM_SIZE[1] & SYS_ADD[13,11,10,33,32,31] )
                 |   ( MAC_BANK[21] & DIMM_SIZE[4] & DRAM_SIZE[2] & SYS_ADD[11,10,09,33,32,31] )
                 |   ( MAC_BANK[22] & DIMM_SIZE[1] & DRAM_SIZE[0] & SYS_ADD[13,11,10,09,32,31] )
                 |   ( MAC_BANK[22] & DIMM_SIZE[2] & DRAM_SIZE[0] & SYS_ADD[13,11,10,33,32,31] )
                 |   ( MAC_BANK[22] & DIMM_SIZE[2] & DRAM_SIZE[1] & SYS_ADD[13,11,10,33,32,31] )
                 |   ( MAC_BANK[22] & DIMM_SIZE[4] & DRAM_SIZE[1] & SYS_ADD[13,11,34,33,32,31] )
                 |   ( MAC_BANK[22] & DIMM_SIZE[4] & DRAM_SIZE[2] & SYS_ADD[11,10,34,33,32,31] )

MAC_ADD[31]     <=  BK_ADD
MAC_ADD[30]     <=  ST_ADD
MAC_ADD[29]     <=  CS_SEL
MAC_ADD[28:26]  <=  WAY_ADD[2:0]
MAC_ADD[25:19]  <=  DIMM_ADD[25:19]
MAC_ADD[18:00]  <=  SYS_ADD[30:14, 05:04]
```

Fig. 8

BASIC (CS0) + EXPANSION (CS1)

| CONFIGURATION | | SYSTEM ADDRESS (SYS_ADD) | | | | | | | | | | | | | | | | | | | | | | DIMM TYPE |
|---|---|---|---|---|---|---|---|---|---|---|---|---|---|---|---|---|---|---|---|---|---|---|---|---|
| MAC + BANK | | 35 | 34 | 33 | 32 | 31 | 30~14 | 13 | 12 | 11 | 10 | 09 | 08 | 07 | 06 | 05 | 04 | 03~00 | | | | | | |
| 1MAC + 1BANK | 1GB(N) | | | | | | 18~02 | | 23 | 22 | 21 | 20 | 19 | 27 | 26 | 01 | 00 | — | | | | | | 512Mb × 18 |
| | 2GB(S) + 1GB(N) | | | | | 29 | 18~02 | 24 | 23 | 22 | 21 | 20 | 30 | 27 | 26 | 01 | 00 | — | | | | | | 512Mb × 36 (S) |
| | 2GB(N) + 2GB(S/N) | | | | 29 | 19 | 18~02 | 24 | 23 | 22 | 21 | 20 | 28 | 27 | 26 | 01 | 00 | — | | | | | | 1Gb × 18 (N) |
| | 4GB(S) + 2GB(N/S) | | | 29 | 20 | 19 | 18~02 | 24 | 23 | 22 | 21 | 30 | 28 | 27 | 26 | 01 | 00 | — | | | | | | 1Gb × 36 (S) |
| | 4GB(N) + 4GB(S/N) | | 29 | 21 | 20 | 19 | 18~02 | 24 | 23 | 22 | 21 | 20 | 28 | 27 | 26 | 01 | 00 | — | | | | | | 2Gb × 18 (N) |
| 1MAC + 2BANK | 1GB(N) | | | | | | 18~02 | | 23 | 22 | 21 | 20 | 27 | BK | 26 | 01 | 00 | — | | | | | | 512Mb × 18 |
| | 2GB(S) + 1GB(N) | | | | | 29 | 18~02 | 24 | 23 | 22 | 21 | 21 | 27 | BK | 26 | 01 | 00 | — | | | | | | 512Mb × 36 (S) |
| | 2GB(N) + 2GB(N/S) | | | | 29 | 19 | 18~02 | 24 | 23 | 22 | 21 | 21 | 27 | BK | 26 | 01 | 00 | — | | | | | | 1Gb × 18 (N) |
| | 4GB(S) + 2GB(N/S) | | | 29 | 20 | 19 | 18~02 | 24 | 23 | 22 | 21 | 30 | 27 | BK | 26 | 01 | 00 | — | | | | | | 1Gb × 36 (S) |
| | 4GB(N) + 4GB(N/S) | | 29 | 21 | 20 | 19 | 18~02 | 24 | 23 | 22 | 22 | 28 | 27 | BK | 26 | 01 | 00 | — | | | | | | 2Gb × 18 (N) |
| 2MAC + 1BANK | 1GB(N) | | | | | | 18~02 | | MAC | 23 | 22 | 21 | 20 | 27 | 26 | 01 | 00 | — | | | | | | 512Mb × 18 |
| | 2GB(S) + 1GB(N) | | | | | 29 | 18~02 | 24 | MAC | 23 | 22 | 21 | 30 | 27 | 26 | 01 | 00 | — | | | | | | 512Mb × 36 (S) |
| | 2GB(N) + 2GB(N/S) | | | | 29 | 19 | 18~02 | 24 | MAC | 23 | 22 | 21 | 28 | 27 | 26 | 01 | 00 | — | | | | | | 1Gb × 18 (N) |
| | 4GB(S) + 2GB(N/S) | | | 29 | 20 | 19 | 18~02 | 24 | MAC | 23 | 22 | 30 | 28 | 27 | 26 | 01 | 00 | — | | | | | | 1Gb × 36 (S) |
| | 4GB(N) + 4GB(N/S) | | 29 | 21 | 20 | 19 | 18~02 | 24 | MAC | 23 | 23 | 28 | 27 | 26 | 26 | 01 | 00 | — | | | | | | 2Gb × 18 (N) |
| 2MAC + 2BANK | 1GB(N) | | | | | | 18~02 | | MAC | 24 | 23 | 22 | 22 | 27 | BK | 01 | 00 | — | | | | | | 512Mb × 18 |
| | 2GB(S) + 1GB(N) | | | | | 29 | 18~02 | 25 | MAC | 24 | 23 | 22 | 30 | 27 | BK | 01 | 00 | — | | | | | | 512Mb × 36 (S) |
| | 2GB(N) + 2GB(N/S) | | | | 29 | 19 | 18~02 | 25 | MAC | 24 | 23 | 22 | 28 | 26 | BK | 01 | 00 | — | | | | | | 1Gb × 18 (N) |
| | 4GB(S) + 2GB(N/S) | | | 29 | 20 | 19 | 18~02 | 25 | MAC | 24 | 23 | 30 | 28 | 26 | BK | 01 | 00 | — | | | | | | 1Gb × 36 (S) |
| | 4GB(N) + 4GB(N/S) | | 29 | 22 | 20 | 19 | 18~02 | 25 | MAC | 24 | 23 | 28 | 27 | 26 | BK | 01 | 00 | — | | | | | | 2Gb × 18 (N) |

MAC: MAC CHIP SELECT ADDRESS
BK: BANK ADDRESS=MAC_ADD[31]

N: NON-STACKED
S: STACKED

Fig.10

| DIMM ADDRESS | 512Mbit-RAM | | 1Gbit-RAM | | 2Gbit-RAM | | REMARKS |
|---|---|---|---|---|---|---|---|
| | Row-ADD | Column-ADD | Row-ADD | Column-ADD | Row-ADD | Column-ADD | |
| A0 | MAC_ADD[11] | MAC_ADD[00] | MAC_ADD[11] | MAC_ADD[00] | MAC_ADD[11] | MAC_ADD[00] | |
| A1 | MAC_ADD[12] | MAC_ADD[01] | MAC_ADD[12] | MAC_ADD[01] | MAC_ADD[12] | MAC_ADD[01] | |
| A2 | MAC_ADD[13] | MAC_ADD[02] | MAC_ADD[13] | MAC_ADD[02] | MAC_ADD[13] | MAC_ADD[02] | |
| A3 | MAC_ADD[14] | MAC_ADD[03] | MAC_ADD[14] | MAC_ADD[03] | MAC_ADD[14] | MAC_ADD[03] | |
| A4 | MAC_ADD[15] | MAC_ADD[04] | MAC_ADD[15] | MAC_ADD[04] | MAC_ADD[15] | MAC_ADD[04] | |
| A5 | MAC_ADD[16] | MAC_ADD[05] | MAC_ADD[16] | MAC_ADD[05] | MAC_ADD[16] | MAC_ADD[05] | |
| A6 | MAC_ADD[17] | MAC_ADD[06] | MAC_ADD[17] | MAC_ADD[06] | MAC_ADD[17] | MAC_ADD[06] | |
| A7 | MAC_ADD[18] | MAC_ADD[07] | MAC_ADD[18] | MAC_ADD[07] | MAC_ADD[18] | MAC_ADD[07] | |
| A8 | MAC_ADD[19] | MAC_ADD[08] | MAC_ADD[19] | MAC_ADD[08] | MAC_ADD[19] | MAC_ADD[08] | |
| A9 | MAC_ADD[20] | MAC_ADD[09] | MAC_ADD[20] | MAC_ADD[09] | MAC_ADD[20] | MAC_ADD[09] | |
| A10 | MAC_ADD[21] | "1" | MAC_ADD[21] | "1" | MAC_ADD[21] | "1" | Auto Precharge bit |
| A11 | MAC_ADD[22] | MAC_ADD[10] | MAC_ADD[22] | MAC_ADD[10] | MAC_ADD[22] | MAC_ADD[10] | |
| A12 | MAC_ADD[23] | "0" (unuse) | MAC_ADD[23] | "0" (unuse) | MAC_ADD[23] | "0" (unuse) | |
| A13 | MAC_ADD[24] | "0" (unuse) | MAC_ADD[24] | "0" (unuse) | MAC_ADD[24] | "0" (unuse) | |
| A14 | "0" (unuse) | "0" unuse | "0" (unuse) | "0" (unuse) | MAC_ADD[25] | "0" (unuse) | |
| BA0 | MAC_ADD[26] | MAC_ADD[26] | MAC_ADD[26] | MAC_ADD[26] | MAC_ADD[26] | MAC_ADD[26] | |
| BA1 | MAC_ADD[27] | MAC_ADD[27] | MAC_ADD[27] | MAC_ADD[27] | MAC_ADD[27] | MAC_ADD[27] | |
| BA2 | "0" (unuse) | "0" (unuse) | MAC_ADD[28] | MAC_ADD[28] | MAC_ADD[28] | MAC_ADD[28] | |
| CS0 | MAC_ADD[29] | MAC_ADD[29] | MAC_ADD[29] | MAC_ADD[29] | MAC_ADD[29] | MAC_ADD[29] | 0:BASIC, 1:EXPANSION |
| CS1 | MAC_ADD[30] | MAC_ADD[30] | MAC_ADD[30] | MAC_ADD[30] | MAC_ADD[30] | MAC_ADD[30] | 0:NON-STACKED, 1:STACKED |

STORAGE CONTROLLER AND STORAGE CONTROL METHOD

BACKGROUND OF THE INVENTION

1. Field of the Invention

The present invention relates to a storage controller and storage control method for controlling a storage unit that can be constructed using a plurality of memory modules.

2. Description of the Related Art

The predominant type of main memory storage used in computers today is SDRAM (Synchronous Dynamic Random Access Memory). SDRAM is characterized by high speed operation achieved by operating synchronously with a system bus clock, and is often used in the form of a DIMM (Dual In-line Memory Module). SDRAMs having a high-speed data transfer feature called the double data rate (DDR) mode, and SDRAMs featuring a DDR2 (Double Data Rate 2) mode, i.e. a speed-enhanced version of DDR-SDRAMs, have been commercially implemented.

FIG. 1 is a diagram showing by way of example a hardware configuration of a system board in a computer system. The system board comprises a central processing unit (CPU) 20, a system controller (SC) 30, a memory access controller (MAC) 40, and a main storage unit (MSU) 50.

The CPU 20 is the part that forms the core of the computer system, and processes data by decoding instructions read out from the MSU 50 via the SC 30 and MAC 40, performing an appropriate operation based on the result of the decoding.

The SC 30 controls data, as well as the order in which the CPU 20 accesses the MSU 50, and enhances the throughput of the MSU 50 by employing an interleaving scheme that allows simultaneous access to different addresses within the MSU 50. The SC 30 converts a system address, which specifies an address in the address space of the system, into a MAC address which is passed to the MAC 40.

The MAC 40 converts the MAC address into a DIMM address, and controls memory access to the MSU 50. The MAC 40 sends an address signal, control signal, chip select signal (CS), etc., to the MSU 50, and transfers a data signal (DQ), data strobe signal (DQS), etc., to and from the MSU 50. A maximum of two such MACs 40 (MAC 0 and MAC 1) can be used.

The MSU 50 comprises a maximum of two banks, BANK 0 and BANK 1. BANK 0 and BANK 1 each comprise an SDRAM-DIMM as a basic memory module unit (basic module) and an SDRAM-DIMM as an expansion memory module unit (expansion module). A maximum of two such MSUs 50 (MSU 0 and MSU 1) can be used to match the number of MACs 40.

To accomplish read/write operations to a given memory module in the MSU 50, the SC 30 converts the system address into the MAC address in accordance with the memory module mounting information, and the MAC 40 converts the MAC address into the DIMM address.

In the prior art system configuration described above, only a memory module having the same device configuration as that of the basic memory module unit can be added as an expansion module on the system board.

FIG. 2 shows the bit structure of a MAR (Memory Assign Register) incorporated in the system controller (SC) as a register for holding memory configuration information. As shown, the MAR comprises a "Physical MSU LIMIT ADD" field, a "MAC" field, a "BANK" field, and a "RAM" field.

The "Physical MSU LIMIT ADD" field indicates the physical MSU limit address. Further, as shown in the figure, the "MAC" field is a two-bit field that indicates the memory access controller (MAC) configuration. Likewise, the "BANK" field is a two-bit field that indicates the bank configuration. On the other hand, the "RAM" field, which is also a two-bit field, indicates the memory module configuration such as DIMM capacity, type of memory device, and number of devices.

The system controller (SC) 30 performs the system address to MAC address conversion based on the values set in the MAR, and activates memory access to the designated memory access controller (MAC) 40.

There are two types of memory modules which are classified according to how DDR/DDR2-SDRAM devices are used to provide the same memory capacity. The two types are called the stacked type and the non-stacked type, respectively. In the stacked type, two sets of memory devices, twice as many as in the non-stacked type, are mounted in a single memory module, and are made individually selectable from the outside via a module pin using two chip select signals (CS0/1). The non-stacked type is controlled by only one chip select signal (CS0).

Since there are two module types as described above, if it is desirable to add a memory module of a different type than that of the basic memory module unit, with the prior art MAR structure it has not been possible to control the system address to the expansion module. Therefore there has been a problem in that modules of different types cannot be mounted in a mixed manner.

In recent years, memory modules have been increasing in capacity, and under the circumstances, when a system with a large memory capacity is needed to meet customer requirements, it is advantageous in terms of cost and supply to use a stacked type rather than a non-stacked type when twice the amount of memory is required.

On the other hand, even when the stacked type is advantageous, if the unit price of memory devices decreases further, the situation may reverse and the non-stacked type may become advantageous in terms of cost and supply. Therefore, there is a need to construct a system that can accommodate both types of memory modules when hardware is commercially implemented.

In the prior art relating to the present invention, Japanese Unexamined Patent Publication No. H11-073368 discloses a memory module accommodating a plurality of different types of memory devices. On the other hand, Japanese Unexamined Patent Publication No. 2003-076603 discloses a memory control method and apparatus wherein provisions are made so that SDRAMs of different types can be selected as desired and so that the SDRAMs of different types can be used in a mixed manner. Further, Japanese Unexamined Patent Publication No. H10-091517 discloses a memory access control method that ensures proper operation even when memory modules of different types are used in a mixed manner.

SUMMARY OF THE INVENTION

The present invention has been devised in view of the above problem, and an object of the invention is to provide a storage controller and storage control method that can control memory addresses even when a memory module having a different device configuration than an already mounted memory module is added as an expansion module.

To achieve the above object, according to the present invention, there is provided a storage controller for controlling a storage unit that can be constructed using a plurality of memory modules, comprising: a register, which stores memory module configuration information for a basic memory module and an expansion memory module independently of each other; and an address conversion unit which, based on the memory module configuration information stored in the register, generates an address that can access the storage unit even when the memory address space of the expansion memory module is different from the memory address space of the basic memory module.

According to the present invention, there is also provided a storage control method for controlling a storage unit that can be constructed using a plurality of memory modules, comprising: storing memory module configuration information in advance in a register for a basic memory module and an expansion memory module independently of each other; and generating, based on the memory module configuration information stored in the register, an address that can access the storage unit even when the memory address space of the expansion memory module is different from the memory address space of the basic memory module.

In one preferred mode, the memory module configuration information contains information that indicates whether the type of mounted memory device is a non-stacked type or a stacked type.

Preferably, the address generated by the address conversion unit contains a bit corresponding to a chip select signal which is not necessary when accessing a memory module of the non-stacked type, but becomes necessary when accessing a memory module of the stacked type.

According to the present invention, there is also provided an information processing apparatus which includes the storage controller described above.

According to the present invention, when there arises, for example, a need to add an extra memory module or to maintain or replace a memory module, a memory module of a different type can be mounted without restrictions in terms of hardware configuration. Further, if production of either the stacked type or the non-stacked type is discontinued in the future, the other type of memory module can be mounted, which serves to enhance serviceability.

BRIEF DESCRIPTION OF THE DRAWINGS

Further features and advantages of the present invention will be apparent from the following description with reference to the accompanying drawings, in which:

FIG. 2 is a diagram showing the bit structure of a prior art MAR (Memory Assign Register) incorporated in a system controller (SC) as a register for holding memory configuration information;

FIG. 4 is a diagram showing the bit structure of a MAR incorporated in a system controller in accordance with the present invention;

FIG. 5 is a diagram showing a logic description in Verilog-HDL (Hardware Description Language) describing the logic of decoders incorporated in the system controller in accordance with the present invention;

FIG. 6 is a diagram showing a logic description in Verilog-HDL describing the logic of a CS bit selector incorporated in the system controller in accordance with the present invention;

FIG. 7 is a diagram showing a logic description in Verilog-HDL describing the logic of a system address/MAC address conversion circuit incorporated in the system controller in accordance with the present invention;

FIG. 8 is a diagram showing how respective bits in a system address are converted to the corresponding bits in a MAC address by using the logic shown in FIG. 7;

FIG. 10 is a diagram showing the mapping of the MAC address to memory device address inputs for various types of DIMM memory device.

DESCRIPTION OF THE PREFERRED EMBODIMENTS

Figure 1:
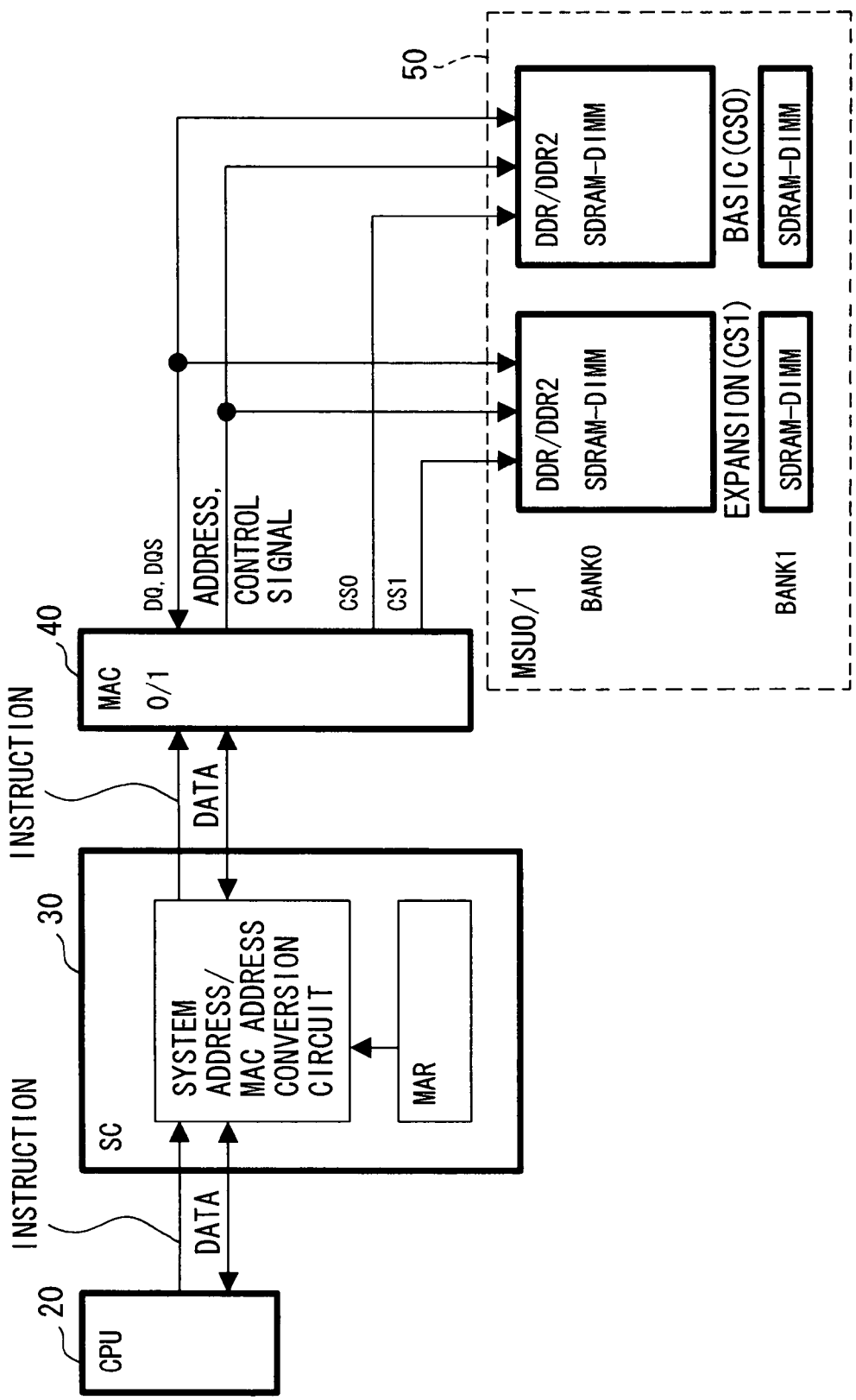
FIG. 1 is a diagram showing by way of example the hardware configuration of a system board in a computer system.
Figure 3:
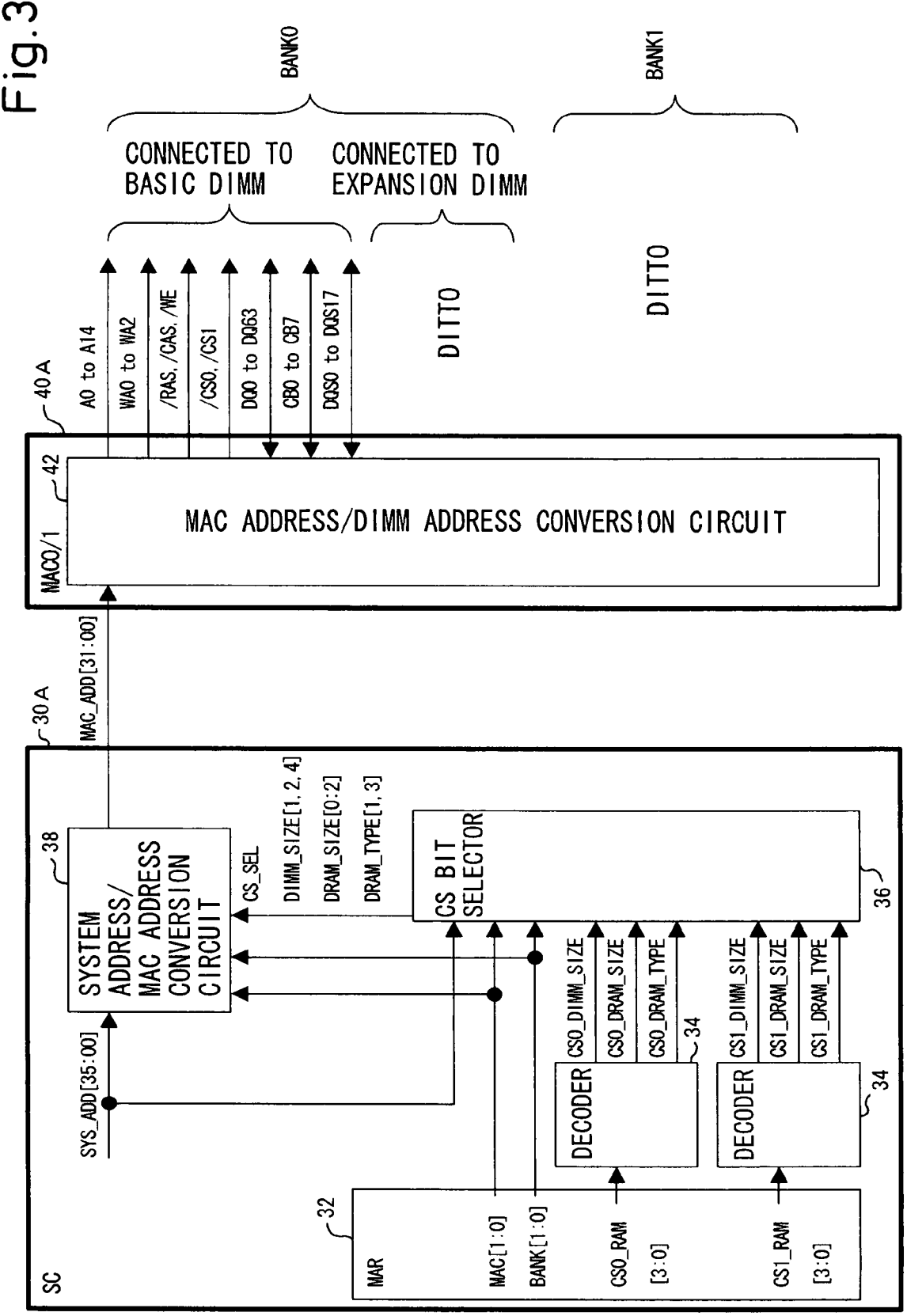
FIG. 3 is a diagram showing a storage controller according to one embodiment of the present invention.

An embodiment of the present invention will be described below with reference to the accompanying drawings. FIG. 3 is a diagram showing a storage controller according to one embodiment of the present invention. In the figure, reference characters 30A and 40A designate a system controller (SC) and a memory access controller (MAC), respectively, which respectively correspond to the SC 30 and MAC 40 in FIG. 1.

The system controller (SC) 30A comprises a MAR (Memory Assign Register) 32 according to the present invention, two decoders 34, a CS bit selector 36, and a system address/MAC address conversion circuit 38. Here, the system controller (SC) 30A converts SYS_ADD [35:00] into MAC_ADD [31:00] which is sent to the memory access controller (MAC) 40A.

The memory access controller (MAC) 40A comprises a MAC address/DIMM address conversion circuit 42 which converts the MAC_ADD [31:00] into A0-A14 (row or column address), WA0-WA2 (way address), /RAS (row address strobe), /CAS (column address strobe), /WE (write enable), /CS (chip select) 0, /CS1, etc. The memory access controller (MAC) 40A transfers DQ0-DQ63 (data), CB0-CB7 (check bits), DQS0-DQS17 (data strobes), etc. to and from the main storage. Here, signals are preceded by "/" are active-low signals.

FIG. 4 shows the bit structure of the MAR (Memory Assign Register) 32 incorporated in the system controller (SC) 30A. The MAR 32 of this embodiment comprises a "Physical MSU LIMIT ADD" field, a "MAC" field, a "BANK" field, a "CS0_RAM" field, and a "CS1_RAM" field. The contents of the "Physical MSU LIMIT ADD", "MAC", and "BANK" fields are the same as those of the corresponding fields of the prior art MAR shown in FIG. 2.

The difference from the prior art shown in FIG. 2 lies in the contents of the field provided to indicate the memory module configuration. In other words, in the prior art, one two-bit "RAM" field is provided to the basic module (CS0) and the expansion module (CS1), in the case of the MAR of the present embodiment shown in FIG. 4 two fields "CS0_RAM" and "CS1_RAM" are provided, one for the basic module (CS0) and the other for the expansion module (CS1), and each field is expanded to four bits.

More specifically, as shown in FIG. 4, the "CS0_RAM" field comprises four bits which indicate DIMM capacity, type of memory device, number of devices, and type of mounting for the basic DIMM (CS0). Likewise, the "CS1_RAM" field comprises four bits which indicate DIMM capacity, type of memory device, number of devices, and type of mounting for the expansion DIMM (CS1).

In this way, by adding information bits defining the configuration of the expansion memory module in the MAR used for controlling the memory configuration, it is possible to control addresses in the expansion memory module, and thus, memory modules of the stacked type and non-stacked type can be mounted in a mixed manner.

With the prior art MAR, since only one type of memory module can be set, an expansion memory module cannot be mounted unless it is of the same type as the basic memory module, but with the modified MAR, since the memory module type can be set for the expansion module independently of the basic module, it is possible to control addresses in the respective memory modules, and any memory module, whether it be of the stacked type or non-stacked type, can be mounted.

FIG. 5 shows a logic description in Verilog-HDL (Hardware Description Language) describing the logic of the decoders 34 incorporated in the system controller (SC) 30A. Each decoder 34 takes as an input the CSn RAM [3:0] (n is 0 or 1) output from the MAR 32 shown in FIG. 4, and decodes it to output CSn_DIMM_SIZE [1, 2, 4], CSn_DRAM_SIZE [0, 1, 2], and CSn_DRAM_TYPE [1, 3].

CSn_DIMM_SIZE [1] output here is a bit indicating that the DIMM capacity is 1 GB, CSn_DIMM_SIZE [2] is a bit indicating that the DIMM capacity is 2 GB, and CSn_DIMM_ SIZE [4] is a bit indicating that the DIMM capacity is 4 GB.

Further, CSn_DRAM_SIZE [0] output here is a bit indicating that the memory device is a 512-Mbit RAM, CSn_DRAM_SIZE [1] is a bit indicating that the memory device is a 1-Gbit RAM, and CSn_DRAM_SIZE [2] is a bit indicating that the memory device is a 2-Gbit RAM.

Likewise, CSn_DRAM_TYPE [1] output here is a bit indicating that the DIMM is a 512-Mbit RAM×36 (stacked type), and CSn_DRAM_TYPE [3] is a bit indicating that the DIMM is a 1-Gbit RAM×36 (stacked type).

FIG. 6 shows a logic description in Verilog-HDL describing the logic of the CS bit selector 36 incorporated into the system controller (SC) 30A. The CS bit selector 36 takes as inputs SYS_ADD [35:31] as a portion of the system address, MAC [1:0] and BANK [1:0] from the MAR 32, CS0_DIMM_SIZE [1,2,4], CS0_DRAM_SIZE [0,1,2], and CS0_DRAM_TYPE [1, 3] from one decoder 34, and CS1_DIMM_SIZE [1,2,4], CS1_DRAM_SIZE [0,1,2], and CS1_DRAM_TYPE [1, 3] from the other decoder 34. Then, the CS bit selector 36 outputs a CS conversion bit CS_SEL and DIMM control signals DIMM_SIZE [1, 2, 4], DRAM_SIZE [0:2], and DRAM_TYPE [1, 3].

In FIG. 6, BNK_NO is a signal indicating whether the bank configuration is a single-bank configuration or a two-bank configuration. MAC_NO is a signal indicating whether the MAC configuration is a single-MAC configuration or a two-MAC configuration. MAC_BANK bits [11, 12, 21, 22] are signals indicating a single-MAC/single-BANK configuration, a single-MAC/two-BANK configuration, a two-MAC/single-BANK configuration, and a two-MAC/two-BANK configuration, respectively.

CS_ADD_SEL [31:35] indicates the reference bit position in the system address bits SYS_ADD [35:31] by which to determine whether the module to be accessed is the basic module (CS0) or the expansion module (CS1). CS_SEL output here is the signal that is set to 0 when the module to be accessed is the basic module (CS0) and to 1 when the module to be accessed is the expansion module (CS1). Further, DIMM_SIZE [1, 2, 4], DRAM_SIZE [0:2], and DRAM_TYPE [1, 3] output here indicate DIMM capacity, type of memory device, etc. for the basic module (CS0) or the expansion module (CS1), whichever is to be accessed.

FIG. 7 shows a logic description in Verilog-HDL describing the logic of the system address/MAC address conversion circuit 38 incorporated in the system controller (SC) 30A. The system address/MAC address conversion circuit 38 converts the system address SYS_ADD [35:00] into the MAC address MAC_ADD [31:00], based on MAC [1:0] and BANK [1:0] supplied from the MAR 32 and on CS_SEL, DIMM_SIZE [1, 2, 4], DRAM_SIZE [0:2], and DRAM_TYPE [1, 3] supplied from the CS bit selector 36.

FIG. 8 shows how the respective bits in SYS_ADD [35:00] are converted to the corresponding bits in MAC_ADD [31:00] by using the logic shown in FIG. 7. Numbers in the figure show the bits in MAC_ADD. As shown in FIG. 8, four SYS_ADD bits [03:00] are discarded. "MAC" and "BK" indicate address bits in interleave control. That is, "BK" is the bank address in the case of the two-bank configuration, and is output as MAC_ADD [31]. On the other hand, "MAC" indicates the MAC select address in the case of the two-MAC configuration.

Figure 9:
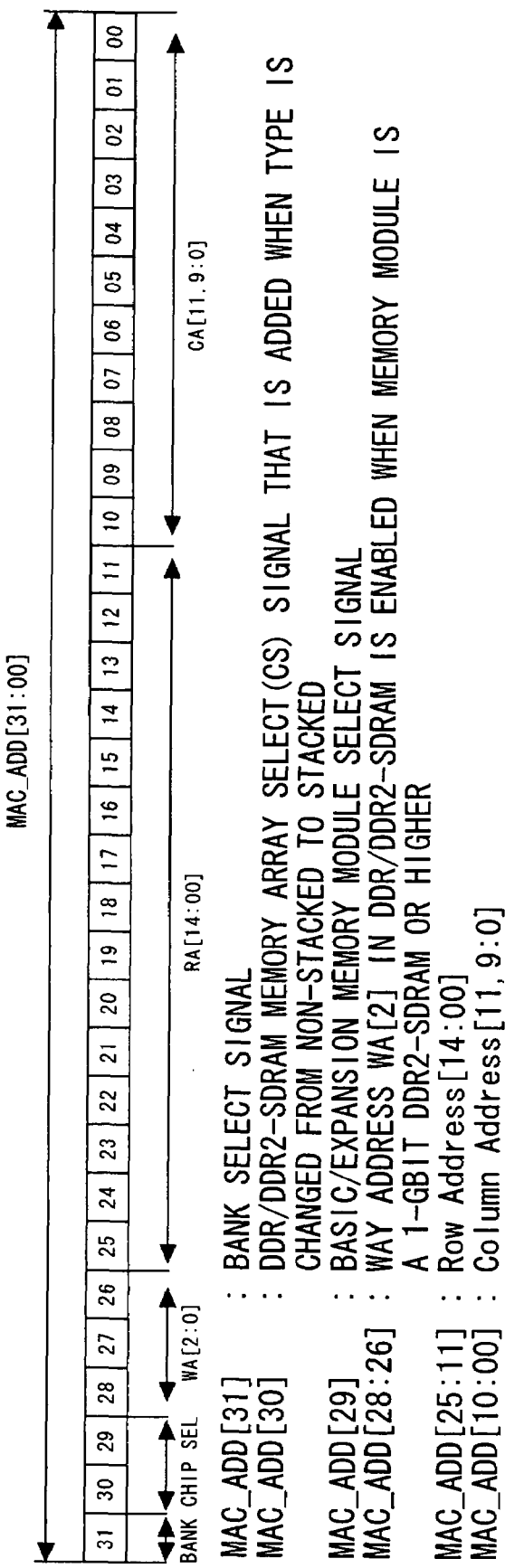
FIG. 9 is a diagram for explaining the conversion performed by a MAC address/DIMM address conversion circuit in a memory access controller (MAC)

FIG. 9 is a diagram explaining the conversion performed by the MAC address/DIMM address conversion circuit 42 in the memory access controller (MAC) 40A. As shown, MAC_ADD [31] is converted to a bank select signal. MAC_ADD [30] is converted to a chip select signal that becomes necessary for the stacked type. MAC_ADD [29] is converted to a signal by which the memory module to be accessed is switched between the basic module and the expansion module.

MAC_ADD [28:26] is converted to a way address WA [2:0] within the DDR/DDR2-SDRAM. Here, WA [2] is enabled when the memory module is a 1-Gbit DDR2-SDRAM or higher. MAC_ADD [25:11] is converted to a row address RA [14:00], while MAC_ADD [10:00] is converted to a column address CA [11, 9:0]. In the present embodiment, CA [10] is a fixed value.

FIG. 10 is a diagram showing the mapping of the MAC address MAC_ADD [30:00] to memory device address inputs for various types of DIMM memory device. As shown in FIG. 10, MAC_ADD [30:00] provides an address that can access any type of memory device whether it be a 512-Mbit RAM or 1-Gbit RAM or 2-Gbit RAM.

By setting the types of memory module for the basic module and the expansion module as described above, it becomes possible to generate an address corresponding to a system address to the desired memory module, even in a configuration where memory modules having different address spaces are used in a mixed manner.

Then, the module configuration information written in a JEDEC (Joint Electron Device Engineering Council) standardized format to an EEPROM (Electronically Erasable and Programmable Read Only Memory) mounted on the memory module is read out by the hardware and automatically set as the DIMM information in the MAR; with this provision, any memory module can be added or replaced without any concern about its mounting configuration.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A storage controller for controlling a storage unit that can be constructed using a plurality of memory modules, comprising:

a register that stores memory module configuration information for a basic memory module and an expansion memory module independently of each other, the memory module configuration information being read from the memory modules and set in the register automatically; and an address conversion unit which, based on said memory module configuration information stored in said register, generates an address that can access said storage unit even when the memory address space of said expansion memory module is different from the memory address space of said basic memory module, wherein said memory module configuration information contains information that indicates whether the type of mounting of memory devices is a non-stacked type or a stacked type.

2. A storage controller as claimed in claim 1, wherein the address generated by said address conversion unit contains a bit corresponding to a chip select signal which is not used when accessing a memory module of the non-stacked type, but used when accessing a memory module of the stacked type.

3. An information processing apparatus which includes a storage controller as claimed in claim 1.

4. A storage control method for controlling a storage unit that can be constructed using a plurality of memory modules, comprising:

reading memory module configuration information for a basic memory module or an expansion memory module from the memory modules automatically;

storing the memory module configuration information in a register for a basic memory module and an expansion memory module independently of each other; and generating, based on said memory module configuration information stored in said register, an address that can access said storage unit even when the memory address space of said expansion memory module is different from the memory address space of said basic memory module, wherein said memory module configuration information contains information that indicates whether the type of mounting of memory devices is a non-stacked type or a stacked type.

5. A storage control method as claimed in claim 4, wherein the address generated contains a bit corresponding to a chip select signal which is not necessary when accessing a memory module of the non-stacked type, but becomes necessary when accessing a memory module of the stacked type.

* * * * *